United States Patent [19]

Donnelly

[11] Patent Number: 4,623,121
[45] Date of Patent: Nov. 18, 1986

[54] BUTTERFLY VALVE SEAT

[75] Inventor: James F. Donnelly, Auburn, Mass.

[73] Assignee: Jamesbury Corporation, Mass.

[21] Appl. No.: 763,323

[22] Filed: Aug. 7, 1985

Related U.S. Application Data

[63] Continuation of Ser. No. 475,647, Mar. 15, 1983, abandoned.

[51] Int. Cl.[4] .......................................... F16K 11/052
[52] U.S. Cl. ...................................... 251/306; 251/305
[58] Field of Search ................ 251/305, 306, 307, 173

[56] References Cited

U.S. PATENT DOCUMENTS

| | | |
|---|---|---|
| 1,977,351 | 10/1934 | Phillips . |
| 3,027,133 | 3/1962 | Anderson . |
| 3,048,363 | 8/1962 | Garrigan . |
| 3,153,427 | 10/1964 | Burtis . |
| 3,168,279 | 2/1965 | Anderson et al. . |
| 3,181,834 | 5/1965 | Jennings et al. . |
| 3,260,496 | 7/1966 | Borcherdt . |
| 3,282,555 | 11/1966 | Mallonee, II et al. . |
| 3,394,915 | 7/1968 | Gachot ................................ 251/315 |
| 3,409,269 | 11/1968 | Fawkes . |
| 3,479,178 | 2/1970 | Priese . |
| 3,528,448 | 9/1970 | Urban . |
| 3,563,510 | 2/1971 | Price . |
| 3,642,248 | 2/1972 | Benware . |
| 3,650,508 | 3/1972 | Kosmala et al. .................... 251/173 |
| 3,734,457 | 5/1973 | Roos . |
| 3,986,699 | 10/1976 | Wucik et al. . |
| 4,005,848 | 2/1975 | Eggleston . |
| 4,044,994 | 8/1977 | Priese . |
| 4,113,268 | 9/1978 | Simmons et al. ................... 251/306 |
| 4,120,482 | 10/1978 | Cox . |
| 4,162,782 | 7/1979 | Wilkins .............................. 251/306 |
| 4,192,484 | 3/1980 | Scaramucci . |
| 4,210,313 | 7/1980 | Chester .............................. 251/173 |
| 4,272,054 | 6/1981 | Zinnai ................................ 251/173 |
| 4,331,319 | 5/1982 | Summers . |
| 4,341,233 | 7/1982 | Broadway .......................... 251/306 |
| 4,418,889 | 12/1983 | Krause ............................... 251/306 |

Primary Examiner—A. Michael Chambers
Assistant Examiner—John C. Fox
Attorney, Agent, or Firm—Oblon, Fisher, Spivak, McClelland & Maier

[57] ABSTRACT

An annular valve seat is fitted in a rotary fluid control valve of the butterfly type. The seat consists of a radially outer tail portion, a radially intermediate metal support portion in the shape of an S and a radially inner metal seal portion having a metal sealing surface in the form of an annular semi-torus. The seal portion includes structure for retaining an elastomeric sealing insert. The valve seat is inserted in a groove between the valve body and an insert, with a small space existing between the axial sides of the groove and the axial sides of the S-shaped intermediate portion. The intermediate portion accordingly permits limited flexure in response to pressure stresses on the valve seat, but the flexure is limited by contact with the walls of the groove. The metal and elastomeric sealing surfaces provide leak-free sealing with an extending life.

1 Claim, 3 Drawing Figures

BUTTERFLY VALVE SEAT

This application is a continuation of application Ser. No. 475,647, filed Mar. 15, 1983, now abandoned.

BACKGROUND OF THE INVENTION

1. Field of the Invention

This invention relates to rotary fluid control valves of the butterfly type wherein a wafer or disc is mounted for rotation between an open position, in which the disc lies substantially parallel to the axis of the fluid flow channel through the valve, and the closed position in which the disc lies perpendicular to this axis. The disc, in its closed position, cooperates with an annular seat circumscribing the fluid flow channel to shut off fluid flow through the channel. The annular seat is held in position by being clamped in a recess formed between complementary surfaces of a portion of the valve body and a valve seat insert. The insert may be bolted to the valve body, or more commonly, the insert is fixed in position when the valve is bolted between the pipe flanges formed on the pipes that convey fluid to and from the valve. An example of this type of valve is described in U.S. Pat. No. 4,331,319, which is herein incorporated by reference.

2. Description of the Prior Art

With a butterfly valve of the type just described, it is desirable to provide features that will optimize the sealing effectiveness of the valve, yet minimize disadvantages apparent in prior art butterfly valves. For example, it is advantageous for a butterfly valve to provide a tight seal regardless of the direction of fluid flow, and continue to do so despite continuous reversal of pressure differentials across the valve. Further, pressure up to and including the full valve pressure rating should be appliable from either direction without leaking across the valve.

Butterfly valves are frequently subjected to a wide range of temperatures, both from the ambient environment in which they operate and from the flowing media being controlled. Further, the temperature will frequently cycle over a relatively wide range and it is advantageous for a butterfly valve to withstand these temperature variations without adverse effects on its sealing capabilities.

The temperature variations described above, as well as bi-directional fluid pressure, can cause distortions of the valve seat which will result in improper sealing between the seat and the butterfly valve disc. In the prior art, it was common to form the valve seat of an elastomeric material, or to provide the valve seat with an elastomeric insert at the sealing surface. The elastomeric material had the advantage that if thermal or fluid pressure stresses caused distortions of the valve seat which would tend to inhibit complete sealing the valve disc and the seat, the elastomeric material at the sealing surface could distort, under the closing torque of the valve seat, so as to deform into the shape of the peripheral surface of the disc and establish a perfect seal.

A further advantage of elastomeric materials for the valve seat, or for sealing inserts of the valve seats, was the tendency of metal sealing surfaces to leak after a few closure cycles as a result of scratches occurring in valve seats having metal seals. That is, unless hardened surfaces were provided for these metal valve seats, impurities in the flowing fluid had a tendency to abrade and scratch the metal valve seats after a few closing cycles. The pressurized fluid could leak past the metal valve seat sealing surface through these scratches.

However, the use of elastomeric materials as the sealing surfaces for valve seats has not been found to be completely satisfactory either. First, although elastomeric valve seat sealing surfaces do not leak as readily as metal valve seat sealing surfaces upon the occurrence of abrasion or wear, the elastomeric valve seat sealing surfaces are more susceptible to softening and failure at high temperatures than metal valve seat sealing surfaces and so must be replaced more often. Metal seats, on the other hand, are not subject to such softening. Second, where flammable fluids are being conveyed, the risk of fire exists and elastomeric valve seats, or valve seat sealing surfaces, may be quickly destroyed under such circumstances.

It is therefore advantageous for a butterfly valve to have a seat that can accommodate thermal and pressure stresses, that will not leak after a few cycles of use, that has a long life and that will be effective at high and low temperatures.

SUMMARY OF THE INVENTION

It is an object of the invention to provide a butterfly valve seat which will not leak when subject to thermal stresses.

It is a further object of the present invention to provide a butterfly valve seat which will not leak when subject to fluid pressure stresses.

It is a further object of the present invention to provide a seat which has redundant sealing surfaces.

It is a further object of the present invention to provide a butterfly valve seat which will not leak due to abrasion after a few cycles of operation.

It is a further object of the present invention to provide a butterfly valve seat having a long life.

It is a further object of the present invention to provide a butterfly valve seat which is not sensitive to machining tolerances of the valve.

It is a further object of the present invention to provide a butterfly valve seat which provides sealing when subjected to high and low temperatures.

It is a further object of the present invention to provide a butterfly valve seat which does not have work hardened metal components and thus conforms to National Association of Corrosion Engineers specifications.

In accordance with the objects of the invention, the valve seat consists of three radially spaced portions. A continuous circumferential tail is clamped between the valve body and an insert of the valve body. Connected to the radially inner end of the tail is an intermediate support portion in the form of an "S" having parallel axially extending legs connected by axially opposite curved base portions. The intermediate support portion of the valve seat is positioned within a circumferential recess of the valve body and is spaced from the radial walls of the recess. The S-shape of the intermediate portion permits the intermediate portion to radially and axially distort so as to absorb both radial and axial stresses on the valve seat. The closely adjacent walls of the recess of the valve body limit the distortion of the intermediate body and permit the intermediate portion to be formed of thin metal.

A radially inner seat portion is integrally formed on the radially inner leg of the support portion. The seat portion includes a metal sealing surface and structure for retaining an elastomeric sealing insert, both of which can contact the disc of the butterfly valve so as to form a redundant fluid tight seal.

The metal seat surface is in the form of an annular semi-torus having a radius of at least 0.04 inches about an annular center line of said semi-torus. The valve seat is normally positioned within the valve so that the metal sealing surface is upstream from the elastomeric insert in the fluid flow direction, thus protecting the elastomeric insert from wear due to fluid flow. In the case of the destruction of the elastomeric insert by fire, the metal sealing surface alone can provide a sealing function.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMEN

Figure 1:
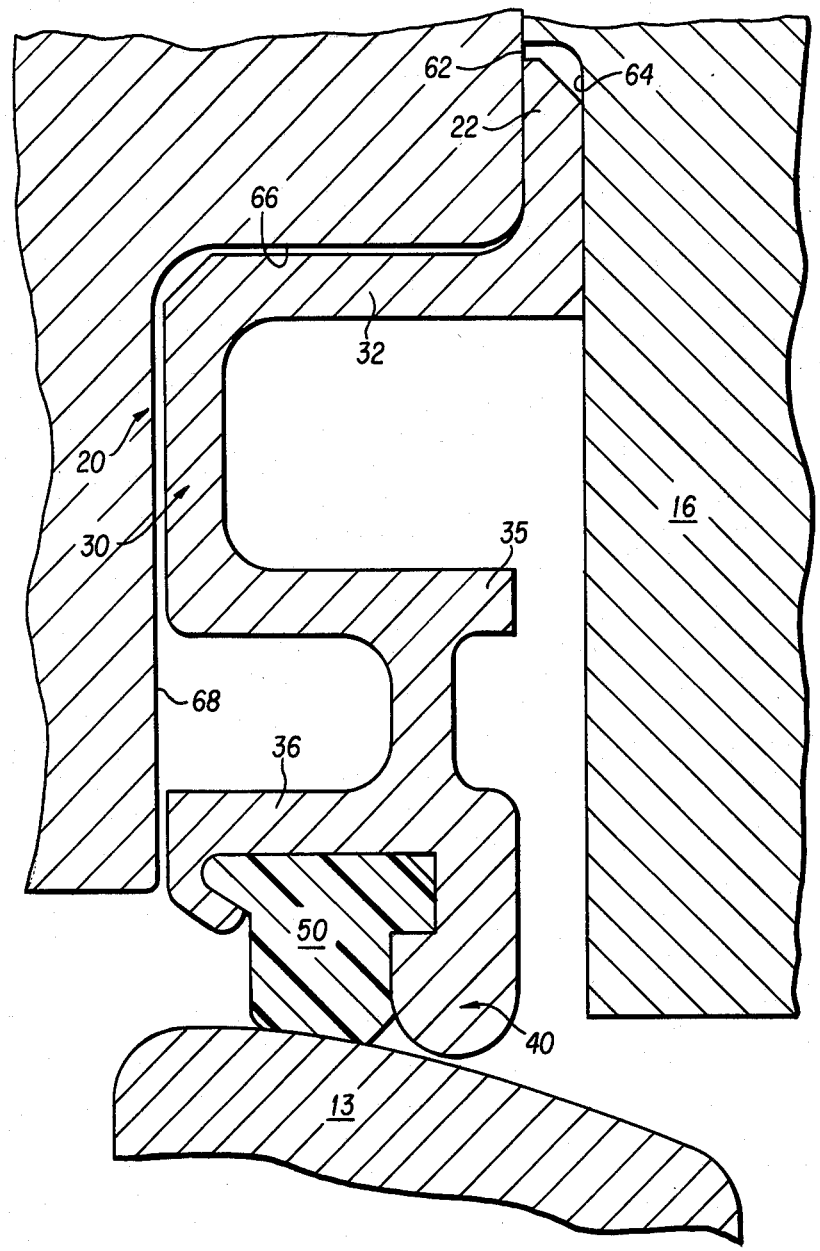
FIG. 1 is a cross-sectional view of the valve seat of the present invention, mounted within a valve body and in sealing cooperation with the sealing surface of the disc of the butterfly valve after an extended period of use.

The present invention will now be described with reference to the attached FIGURES wherein the same reference numerals are used for the same or corresponding parts throughout the several views.

The valve seat of the present invention is inserted in a butterfly valve assembly such as that shown in FIG. 1 of said U.S. Pat. No. 4,331,319. In particular, as seen in the accompanying FIGS. 1 and 2, the valve seat 20 consists of a radially outer tail portion 22, a radially intermediate support portion 30 and a radially inner seat portion 40. Except as otherwise noted, the valve seat is formed of corrosion resistant metal, such as stainless steel. An elastomeric insert 50, which can be formed of polytetrafluoroethylene, is secured to the sealing portion, as will be described below.

The radially outer tail portion is elongated in the radial direction and has opposing radially extending surfaces 24 and 26. Surface 26 may be provided with concentric annular serrations (not shown). The tail portion is integrally formed with the support portion 30 and is joined thereto via a 90° bend 28.

The intermediate portion approximates the shape of an S having parallel axially extending leg portions 32, 34 and 36. The leg portions are joined by radially separated and axially opposite base portions 31 and 33. The base portions are connected to the leg portions via 90° bends, preferably having small radii of curvature (approximately 0.030 inches). An extension 35 of the intermediate leg portion 34 forms a stop, whose function will be described below.

The seal portion 40 includes a radial leg 42 extending inward from the joint defined by the base portion 33 and the radially inner leg portion 36. The radial leg 42 terminates at its distal end in an annular metal sealing surface 44. The metal sealing surface is concentric about annular center line 46, and accordingly forms a semi-torus.

According to the present invention, the radius of sealing surface 44 about annular line 46 is no less than 0.04 inches, and is preferably not substantially larger than this value. A small radius of surface 44 about line 46 assures high hertzian contact stresses which results in better seat-disc sealing without harming the disc surface. A smaller radius, on the other hand, would constitute a sharp edge which is scratch sensitive and can harm the disc surface. In addition, the use of a curved metal sealing surface, rather than an edge, allows the application of hard coatings, which may be applied by techniques including electroplating, chemical plating and plasma coating.

Figures 2, 3:
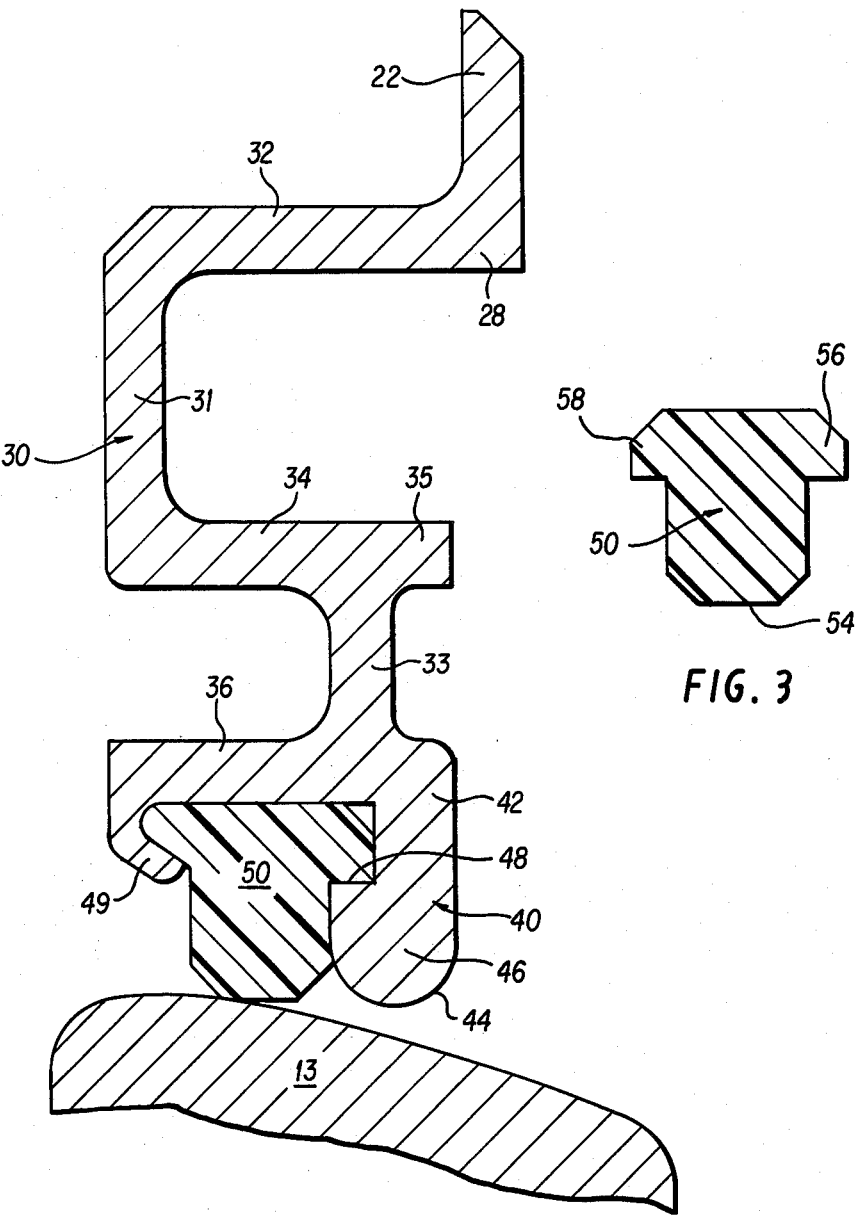
FIG. 2 is an enlarged cross-sectional view of the valve seat of FIG. 1 showing the sealing configuration between the valve seat and the valve disc when a new valve seat is introduced into the valve.
FIG. 3 is a sectional view of the elastomeric insert prior to being crimped into the valve seat.

The sealing portion includes structure for securing the elastomeric sealing insert 50, which is also shown in FIG. 3. In particular, the sealing portion includes a shoulder 48 on leg 42 and an opposing leg 49.

The elastomeric insert, which may be formed of polytetrafluoroethylene, has a main body portion 52 with a sealing surface 54 at one end. Opposite the sealing surface are a pair of transverse projections 56 and 58. The annular insert 50 is inserted into the annular valve seat with the projection 56 fitted in the groove formed by the shoulder 48. The leg 49 is then bent so as to crimp the projection 58 and lock the insert 50 into position on the valve seat.

In use, the annular valve seat is clamped at the tail portion 22 between the parallel surfaces 62 and 64 of the valve body 11 and the insert 16. The concentric serrations (not shown) increase the frictional grip between the tail portion 22 and the wall 62, and prevent the seat from slipping into the path of the disc. Moreover, the fixed tail with serrations clamped between the valve body 11 and the insert 16 provides positive gasketing required for bubble tight sealing. Two further advantages of a fixed tail clamped between the valve body 11 and the insert 16 are that the positive sealing is not sensitive to machine tolerances or to sudden temperature changes.

As can be seen in FIG. 1, small spaces exist between the walls of the intermediate support portion 30 and the walls 64, 66 and 68 of the valve body 11 and the insert 16. The spaces permit small amounts of axial and radial deflection for the support portion as a result of thermal and pressure stresses, as well as stresses due to the contact between the valve seat and the moving valve disc. The degree of deflection of the valve seat is limited by contact between the support portion and the walls 64 through 68, in particular, contact between the stop 35 and the wall 64. The S-shape of the intermediate support portion permits deflections in both the radial and axial directions and provides balanced loading under bi-directional pressure.

The flexure of the intermediate support portion is enhanced by the relatively thin walls of the support portion. This reduces the torque necessary to rotate the valve disc 13. The support portion need not have thick walls since the walls 64 through 68 limit the degree of deflection thereof under pressure stresses. The support of the wall 62 through 68 also means that high strength or work hardened materials are not necessary. Since National Association of Corrosion Engineers specifications do not allow work hardened material, this is an important feature.

When the valve seat is first inserted into the valve, contact between the valve seat and the valve disc 13 occurs, as seen in FIG. 2. As can there be seen, the sealing surface is comprised by the sealing portion 54 of the insert 50. The elastomeric insert provides good sealing contact with no leakage, since the elastomeric surface is not sensitive to leaks resulting from scratches, as is metal.

After a relatively long period of use, the elastomeric insert becomes worn with use, as is shown in FIG. 1. At that time, sealing contact between the valve disc 13 and the valve seat is provided by both the elastomeric insert and the metal sealing surface 44, and subsequent wear of the elastomeric insert is limited to the same rate as that of the metal sealing surface 44. The redundancy of the sealing surfaces assures a good seal.

The surface 44 has a small radius about line 46, of about 0.04 inches. This small radius yields high hertzian contact stresses resulting in a better seat-disc seal without harming the disc surface as an edge would. Moreover, the 0.04 inch radius is less scratch sensitive than a sharp edge would be.

As a further feature of this arrangement, the valve seat is typically placed within the valve body such that the fluid flow is from right to left, as seen in FIG. 1. Therefore, the fluid flow stream passes around the surface 44 before reaching the insert 50. The shape of the sealing surface 44 results in a laminar flow around surface 44 such that the elastomeric surface 50 is not subject to direct contact with the high flow rate fluid, and the wear of the insert 50 is accordingly reduced.

Of course, should the elastomeric insert be destroyed by high temperature or fire at any time, the entire sealing function could be carried by the metal sealing surface 44 with only a small amount of leakage due to scratches on the surface thereof.

Obviously, numerous modifications and variations of the present invention are possible in light of the above teachings. It is therefore to be understood that within the scope of the appended claim, the invention may be practiced otherwise than as specifically described herein.

What is claimed as new and desired to be secured by Letters Patent of the United States is:

1. In a rotary fluid control valve of the butterfly type, said valve including a housing and a butterfly valve disc, an annular valve seat comprising:

a radially intermediate metal support portion, said intermediate support portion approximating the shape of an S having radially outer, intermediate and inner parallel legs connected by radially inner and outer, axially opposed bases, wherein said intermediate leg includes an axial extension defining a stop, wherein said support portion is of substantially constant thickness along the length of said S-shape, whereby said support portion can flex in response to thermal and mechanical stresses, wherein said intermediate support portion is positioned within a recess of said valve body having radial walls, and wherein walls of said intermediate portion are positioned closely adjacent to, and spaced from, said radial walls of said recess, whereby said radial walls of said recess limit axial flexure of said intermediate portion;

a radially outer metal tail portion, wherein said tail portion is circumferentially continuous, is unitarily formed with an end of said outer leg opposite said radially outer base, is clamped between two portions of sid valve body, and is elongated radially outward from said radially outer leg;

a radially inner metal sealing portion comprising:
   (a) an annular sealing leg extending radially towards said valve disc from an area of intersection of said radially inner base and said radially inner parallel leg,
   (b) a metal sealing surface at a distal end of said sealing leg, said sealing surface defining an annular semi-torus, a radius of said sealing surface about an annular center line thereof being approximately 0.04 inches, said sealing surface being coated with a hard metallic material,
   (c) an annular opposing leg extending obliquely from an end of said radially inner parallel leg opposite said sealing leg, and
   (d) a shoulder on said sealing leg, and an elastomeric insert having a sealing surface and opposing projections, whereins said elastomeric insert is fitted onto said seat portion with one of said insert projections fitting into a recess defined in part by said sealing leg shoulder and a second of said insert projections is crimped by said opposing leg, and wherein said elastomeric insert sealing surface is substantially axially spaced from said metal sealing surface and is positioned so as to be engagable with said valve disc, whereby said metal sealing surface can engage said valve disc upon destruction of at least a portion of said insert.

* * * * *

UNITED STATES PATENT AND TRADEMARK OFFICE
CERTIFICATE OF CORRECTION

PATENT NO. : 4,623,121

DATED : November 18, 1986

INVENTOR(S) : James F. Donnelly et al

It is certified that error appears in the above-identified patent and that said Letters Patent is hereby corrected as shown below:

On the title page Item (19) should read
-- Donnelly et al --.

Item (75) Inventors should read
-- James F. Donnelly, Auburn, Mass, Arie P. Bregman, Sterling Junction, Mass. --.

Signed and Sealed this

Seventeenth Day of February, 1987

Attest:

DONALD J. QUIGG

Attesting Officer     Commissioner of Patents and Trademarks